United States Patent Office 3,507,934
Patented Apr. 21, 1970

3,507,934
BLOCK COPOLYMER COMPOSITIONS HAVING IMPROVED PROCESSABILITY
Harry B. Minor, Orinda, Alfred W. Shaw, Moraga, and Charles H. Wilcoxen, Jr., San Lorenzo, Calif., assignors to Shell Oil Company, New York, N.Y., a corporation of Delaware
No Drawing. Filed Dec. 20, 1965, Ser. No. 515,220
Int. Cl. C08d 5/02; C08f 27/24
U.S. Cl. 260—876
5 Claims

ABSTRACT OF THE DISCLOSURE

Block copoylmers are provided having the general configuration A—B—A, wherein the A blocks of a polyvinyl arene have a controlled spread of molecular weight species and the center block B is a conjugated diene.

This invention is concerned with new block copolymer compositions. More particularly, it is directed to the preparation of block copolymer compositions having improved processability while still maintaining satisfactory tensile strength and other properties. The invention is also concerned with the preparaiton of such compositions.

A relatively recent development in the field of polymers has been the preparation of block copolymers, particularly those having the general configuration

A—B—A wherein the terminal block A are thermoplastic blocks while the center block B is an elastomeric polymer block. When suitable molecular weight relationships exist between the terminal blocks and the center block, the resulting block copolymer is said to have "self-curing" properties. By this is meant a block copolymer exhibiting the general stress-strain properties of a vulcanized rubber even though it has not necessarily been subjected to chemical cross-linking or vulcanizing treatments. The advantages of such materials are manifold and include the reduction in processing costs required since vulcanization treatments are eliminated. Moreover, since the product has not been vulcanized, it is possible to recover scrap from any forming operation and recycle it for further use. This cannot be done with vulcanized rubbers which after vulcanization are not subject to reuse except as scrap or ground rubber filler.

Due to the peculiar physical properties of these block copolymers, the latitude in molecular weight ranges of the individual blocks is relatively narrow. Moreover, the block copoylmers having the optimum set of stress-strain properties and other physical properties for commercial use have been found to be difficult or even impossible to process. Of course, it is possible to add plasticizers such as rubber extender oils, but there is a limit to the extent that this alternative may be employed since with increasing proportion of extender oils or other plasticizers many of the physical properties become less and less desirable.

It is an object of the present invention to provide improved block copolymer compositions. It is a further object of the invention to provide block copolymer compositions having improved processability while still maintaining a satisfactory set of other physical properties. It is a further object of the invention to provide a process for the preparation of such compositions. Other objects will become apparent during the following detailed description of the invention.

Now, in accordance with the present invention, new compositions of matter are provided comprising block copolymers of the group consisting of those having the general configuration

A—B—A wherein each A is a polyvinyl arene block and B is a conjugated diene polymer block wherein:

(a) each A has an average molecular weight between about 8,000 and about 35,000;
(b) between about 7.5 and 30 mol percent of the A blocks have an average molecular weight between about 3,000 and about 12,000; and
(c) block B has an average molecular weight between about 40,000 and about 150,000; and hydrogenated derivatives of said copolymers.

Where, in the specifications and claims, reference is made to average molecular weights, reference is being made to number average molecular weights as distinguished from weight average molecular weights, as determined by intrinsic viscosity measurements and coordinated tritium counting methods, osmotic pressure methods or light scattering methods of molecular weight determination. In addition to the block copolymers just described, the hydrogenation derivative thereof may also be utilized preferably those in which 50% of the original unsaturation has been reduced by hydrogenation.

The invention is especially directed to block copolymers prepared by a coupling process to be described in detail hereinafter since the problem of processability has been found in the past to be especially acute with such coupled products. The problem is also most acute with hydrogenated block copolymers and particularly so with hydrogenated coupled block copolymers.

The problem facing development in this area constantly comprises the improvement in a particular property without damage to other properties which must be either maintained or improved. Since the major concern in the present instance was to improve the processability of the subject block copolymers, it was necessary to devise a means and establish limits relative to molecular weights of the individual polymer blocks which would achieve this primary objective without damage to other physical properties such as tensile strength, elongation, and allied properties.

The invention is especially concerned with block copolymers having the general configuration

A—B—A wherein each A is a polyvinyl arene block and B is a conjugated diene polymer block and their hydrogenated equivalent. The invention comprised the investigation of and discovery within the area of varying the molecular weight spread of the polyvinyl arene blocks which would accomplish the above defined objectives. As intimated hereinabove, the average molecular weight of the individual blocks are relatively restricted in order to attain any satisfactory degree of processability whatsoever. However, within this restrictive framework, it was further established that it was necessary to spread the molecular weight of the polyvinyl arene blocks to an extent defined hereinafter and that if the variation in individual components of the molecular weight spread went beyond the limits defined herewith physical properties of the resulting block copolymers fell off and the resulting copolymers were defective in one property or another. It was found that the average molecular weight of the polyvinyl arene blocks should be between about 8,000 and about 35,000 and furthermore between 7.5 and 30 mol percent of the polyvinyl arene blocks should have an average molecular weight between about 3,000 and about 12,000. Furthermore, in order to maintain elastomeric properties of the self-curing characteristics referred to above, it is necessary that the conjugated diene polymer block B have an average molecular weight between about 40,000 and about 150,000, the weight percentage of polyvinyl arene blocks in the total block copolymer being between about 15 and about 40 percent.

The conjugated dienes useful for the preparation of the elastomeric center block preferably have from 4 to 8 atoms per molecule and include especially butadiene and isoprene as well as methyl isoprene and dimethyl isoprene, while the monovinyl arenes may be styrene, alpha-methyl styrene, etc.

It has been found that if the proportion of relatively low molecular weight thermoplastic end blocks is excessive the tensile strength of the resulting block copolymers is drastically reduced especially at elevated temperatures. On the other hand, if a low proportion of relatively low molecular weight polyvinyl arene block is present then the processability of the block copolymers eventually formed is virtually unchanged. Moreover, if the proportion of polyvinyl arene blocks to the total block copolymer weight is in excess of that specified hereinbefore the block copolymers begin to lose their elastomeric set of properties and more closely resemble thermoplastic resins. This is exhibited, for example, by "drawing" effect noted upon extensive elongation of the specimens.

While the invention is of substantial benefit with respect to the non-hydrogenated polymers, it becomes of more striking benefit in the comparison of the hydrogenated derivatives of these block copolymers. That is to say, if a given block copolymer which does not have a spread in molecular weight species in the terminal polymer blocks is compared with a block copolymer of similar average block molecular weight but having the specified spread according to the invention, the difference between these two is of much more striking significance in the hydrogenated species than in the parent block copolymer prior to hydrogenation.

Hydrogenation of the block copolymers does not form a part of the present invention but may be effected with a variety of hydrogenation catalysts such as nickel on kieselguhr, but more preferably with Ziegler types of catalysts and particularly with combinations of cobalt or nickel salts with aluminum alkyl halides. The purpose of hydrogenation is normally to improve the oxidation and ozonization resistance and at the same time to raise the softening point of the polymers. A substantially more stable block copolymer is formed by the hydrogenation of only the double bonds of the conjugated diene block but in the normal course of such hydrogenation the polyvinyl arene blocks are hydrogenated as well. Stability is materially improved by reduction of at least 50% of the original unsaturation and still more preferably by about 80%. This may be expressed as a block copolymer having a residual unsaturation of less than 20%.

The preferred block copolymers of the present invention having the unsaturation reduced to a residual unsaturation of less than 20% are those wherein prior to hydrogenation the basic structure

A—B—A is such that each polyvinyl arene block A has an average molecular weight between about 12,000 and 25,000; between about 10 and about 25 mol percent of the A block having an average molecular weight of 4,000–11,000; and block B has an average molecular weight between about 50,000 and 120,000. Preferred species of block copolymer to which the invention particularly applies include those having the structure prior to hydrogenation of polystyrene-polybutadiene-polystyrene and polystyrene-polyisoprene-polystyrene.

The most effective utilization of the present invention is with respect to coupled block copolymers which have been hydrogenated. Nonetheless, the invention also applies with effectiveness to improving the properties of coupled polymers which have not been hydrogenated and also to block copolymers which have been prepared by sequential processes to be described hereinafter.

The process for the formation of the compositions of this invention comprise improvements on the basic processes by which block copolymers heretofore have been formed. The general process for preparation of polymers according to the prior art comprises the selection of suitable monomers for both the thermoplastic end blocks A and of the center elastomeric block B and polymerizing them in such a manner as to form the suitable blocks, utilizing catalysts found to be suitable for this purpose. Most specifically, the type of catalyst favored for this purpose is a lithium catalyst which may be lithium metal, lithium alkyl, or other lithium compounds causing polymerization of the individual monomers in such a way as to form a "living polymer" terminated at one or both ends of a growing polymer chain with a lithium radical. In the present process, attention is especially directed to the use of monofunctional lithium catalyst and more particularly to lithium alkyl catalysts, preferably secondary alkyl catalysts such as secondary butyl lithium.

Two types of processes are considered here, the less favored being the sequential process wherein the first thermoplastic block-forming monomer such as styrene being contacted in an inert hydrocarbon solution with the catalyst such as a secondary alkyl lithium at temperatures between about —50 and about 100° C. This causes rapid polymerization of the monomer to form a first polymer block A—Li. Thereafter, the second monomer such as butadiene is injected into the system and polymerization is continued to form the intermediate block copolymer A—B—Li. Finally, after the desired molecular weight has been attained, the same or a different thermoplastic block forming monomer is injected into the system and the final block copolymer A—B—A is polymerized.

The preferred alternative process involves a coupling step permitting closer control over the final product. In this alternative process, the stage of forming the first polymer block A is identical with that just described and the step of forming the intermediate polymer block also is identical with that just described with the exception that the polymer block B is permitted to grow only to half its ultimately desired length. Forming, in effect, a block copolymer having the general configuration A—(½B)—Li At this stage a difunctional coupling agent is added to the system such as a di-halo hydrocarbon, preferably one such as 1,2-dibromoethane. This causes coupling of the intermediate block copolymers with an insignificant coupling residue, namely, the hydrocarbon portion of the coupling agent at the center which for the purpose of describing and claiming the present invention may be ignored. The product obtained is the desired block copolymer insofar as the basic structure is concerned, namely, A—B—A.

The difficulty with respect to the processability of the resulting block copolymers lies in the extremely uniform rate of polymerization in the end blocks resulting in what may be called a mono-dispersed system wherein essentially all of the molecules of the blocks A may be regarded as having virtually the same molecular weight. While this results in extremely close control of the structure and results in high tensile strength of the product, the processability of the block copolymers so formed has left much to be desired. The present invention comprises alteration in the formation of the block A in such a manner as to maintain the stress-strain properties of the block copolymer but to improve the processability thereof.

The prior art processes just described generally were based upon the presence of the entire amount of catalyst during all stages of the block formation. This in effect, was the primary reason for the processability difficulties encountered since it enforced the formation of an extremely narrow molecular weight product in the end blocks A. The present invention is based upon the discovery, first, that a spread in the molecular weight range of the blocks A as defined hereinbefore improves processability but maintains the stress-strain properties and secondly, the invention comprises the discovery of means for suitably creating such a spread in molecular weight. Of course, it is possible to prepare separately several block polymers and thereafter blend them, choosing the block molecular weights and proportions thereof to result in a composition having improved processability and good stress-strain properties. However, from a commercial view point, such blending operations are uneconomic and cumbersome. It is therefore highly desirable both technically and economically to devise a method wherein the desired block copolymer having the defined spread in molecular weights in the thermoplastic blocks A is formed in a single reaction.

Therefore, in accordance with the present invention, the compositions described and claimed herewith may be prepared by programing the catalyst into the polymerization zone in such a way as to form in situ, a mixture of molecules of the blocks A, the program being planned and executed so as to form the described and claimed proportion of average and lower molecular weight thermoplastic blocks. This is accomplished by first determining the rate of reaction of the A block monomer under a given set of solvent and temperature and catalyst concentration conditions deciding the average molecular weight of the blocks A which are desired, deciding the proportion and molecular weight of the lower molecular weight fraction thereof necessary for improvement in processability and the corresponding proportion and molecular weight of high molecular weight for maintaining stress-strain properties and thereafter injecting the catalyst into the system to achieve these ends. More specifically, in order to attain the desired mixture of block copolymer A components it is necessary to inject a first proportion of the catalyst in the system for the formation of a relatively high molecular weight fraction, thereafter injecting a second proportion (usually the major amount) of the catalyst for the formation of a substantial fraction of the blocks A having the desired molecular weight of the average, and thereafter injecting a final and limited amount of the catalyst at such a time that after the continued polymerization is effected the resulting latest formed polymer blocks are those having the relatively lower molecular weight. It will then be found that the system has a variety of molecular weight species including three principal components present therein: A relatively high molecular weight proportion balancing the relatively low molecular weight proportion in such a way as to result in the desired average molecular weight and third, usually, the largest, proportion formed to have the molecular weight at about the point of the average desired.

Having formed the suitable mixture of polymer blocks A, each molecule terminated with a lithium radical, the process then proceeds as described hereinbefore either by the sequential route or the coupling route, preferably the latter. Also, it is found that the most striking improvement in processability while maintaining other physical properties is present in the polymers which, subsequent to block polymer formation, are hydrogenated as described hereinbefore.

As long as the block copolymers formed have the ratio of block components described and claimed herewith the processability of the product is substantially improved as compared with a block copolymer formed by the prior art process, which does not permit any appreciable or controllable amount of molecular weights spread in the individual blocks. At the same time, the stress-strain properties are maintained as will be shown by the data contained in the working examples.

In order to compare the processability and extrusion quality of block copolymers wherein the terminal polymer blocks are either monodispersed (as in the prior art) or contain a spread of molecular weights, in accordance with the present invention, a series of block copolymers was prepared, hydrogenated, and then subjected to tests indicative of processability. The basic structure of the block copolymers prior to hydrogenation polystyrene-polyisoprene-polystyrene and every reasonable effort was made to obtain polmers having block molecular weights in the order of 14,000–74,000–14,000. These block copolymers were then hydrogenated so as to eliminate all carbon-to-carbon unsaturation. The block copolymers were prepared by a coupling process and details of their structures and corresponding physical properties are contained in the following table. The prior art sample is sample A, was prepared by polymerization in solution, utilizing secondary butyl lithium catalyst, all of which was present at the start of the polymerization. The remaining samples are all variations on this procedure, the difference being that in the individual cases the polymerizations were varied by either intermittent or continuous injection of the catalyst. Sample B will be described in greater detail to illustrate the means by which the other samples were prepared, the variation from the described procedure being in the incremental or continuous addition of catalyst and the proportion of the individual increments.

To secure the trinodal distribution in the terminal polymer blocks of sample B, it was decided that 20% of the molecules should have a molecular weight of about 24,000, 60% should have about 14,000 molecular weight and 20% should have about 4,000 molecular weight. On a weight basis, the respective percentages are 34, 60 and 6%. The total monomer charge of styrene was dissolved in cyclohexane solvent to give about a 20% by weight solution. This mixture was then heated to about 40° C., selected on the basis of reaction rate to allow necessary manipulation. The solvent and monomer were brought to the point of incipient polymerization by carefully titrating the impurities contained in the solution with a dilute solution of the secondary butyl lithium catalyst.

Twenty percent of the catalyst was then added in a single increment and allowed to react for two minutes. This is the time calculated to give the monomer conversion (about 13%) to produce 10,000 molecular weight increment in polymer weight for this amount of catalyst. At this point, an additional 60% of the catalyst was added, to give a total of 80% of the planned amount of total catalyst. The first increment and the second increment of catalyst were reacted for 8 minutes with polystyrene to convert another 65% of the monomer. This produced about a 10,000 molecular weight increment resulting in 20% of the molecules with 25,000 molecular weight and 60% with 10,000 molecular weight. At this point, the remainder of the catalyst was added. All three incremental portions of the catalyst were allowed to react until monomer was exhausted. This produced a 4,000 molecular weight increase in all segments, giving 20 mol percent of 4,000 molecular weight, 60 mol percent of 14,000 molecular weight and 20 mol percent of 24,000 molecular weight. To the solution of the mixture of living polymers, whose chains are terminated with lithium radicals, isoprene monomer was added and allowed to polymerize to a calculated molecular weight of ½ of that desired in the final copolymer. 1,2-dibromoethane was then added to the mixture which caused coupling of the polymers to produce the coupled three-block polymer having the structure polystyrene-polyisoprene-polystyrene wherein the polystyrene blocks were varied as shown in the table with the exception of sample A wherein all of the catalyst was present from initial point of polymerization. The block polymers were then subjected to hydrogenation, isolated and tested as shown in the following table. It will be noted that sample A in which the terminal blocks have no molecular weight variation had a relatively slow rate of flow through the capillary melt viscometer as compared with the remaining samples wherein the terminal blocks were mixtures of molecular weight species. Moreover, it will be noted from the table that the extrusion quality substantially improved with the samples having the variation in molecular weights in the terminal blocks. Furthermore, it is of material importance that the extrusion temperature or other processing temperature may be reduced when the terminal blocks are mixtures of molecular weights species. This improvement in processability is materially enhanced by the additional but optional presence of 0.5–5% by weight of an alkaline earth metal fatty acid soap such as calcium stearate or calcium oleate, as well as the corresponding magnesium soaps. In fact, the combination of the alkaline earth metal soap with the mixed block copolymers of the present invention enable a reduction in extrusion temperature in the order of about 50–150° F., while still obtaining improved extrusion rates and product quality.

block copolymer A—B—A is formed, the improvement comprising forming a polymerization mixture of polyvinyl arene blocks by addition of at least two proportions of catalyst during incremental or continuous additions of a secondary alkyl lithium catalyst.

2. A product prepared according to the process of claim 1, and hydrogenated derivatives thereof having residual unsaturation of less than about 50%.

3. A produce prepared according to the process of claim 1 comprising hydrogenated block copolymers having a residual unsaturation of less than 20% and having a configuration prior to hydrogenation, of

A—B—A wherein each A is a polyvinyl arene block and B is a conjugated dienearene block wherein:
  (a) each A has an average molecular weight between about 12,000 and about 25,000;
  (b) between about 10 and about 25 mol percent of the A blocks having an average molecular weight of 4,000–11,000; and
  (c) block B has an average molecular weight between about 50,000 and 120,000.

4. A product according to claim 3 wherein the polymer A—B—A is polystyrene-polyisoprene-polystyrene.

5. A product according to claim 3 wherein the polymer A—B—A is polystyrene-polybutadiene-polystyrene.

TABLE.—SUMMARY OF PROPERTIES OF COUPLED HYDROGENATED BLOCK POLYMERS HAVING VARYING DISTRIBUTION OF MOLECULAR WEIGHT IN THE TERMINAL BLOCKS

| Sample | A | B | C | D | E | F | G | H |
|---|---|---|---|---|---|---|---|---|
| Average tritium molecular weight ($\times 10^{-3}$) of blocks | 14-74-14 | 13-70-13 | 13-72-13 | 12-72-12 | 14-76-14 | 14-76-14 | 14-78-14 | 14-76-14 |
| Molecular weight distribution of terminal blocks | None | 20%, 23,000 60%, 14,500 20%, 3,100 | 20%, 17,000 60%, 14,000 20%, 11,000 | 10%, 35,000 20%, 21,000 40%, 11,000 20%, 7,000 10%, 5,000 | Continuous Avg.=24,000 45%, 6,000 | Continuous Avg.=24,000 Floor=9,400 | 50%, 22,000 50%, 6,300 | 10%, 30,000 80%, 13,000 10%, 5,000 |
| Tensile strength, p.s.i.: | | | | | | | | |
| At 23° C | 6,300 | 6,210 | 6,200 | 5,375 | 7,230 | 5,480 | 5,690 | 5,390 |
| At 100° C | 950 | 605 | 900 | 170 | 855 | 860 | 530 | 910 |
| "Quick" CMV¹, lb., 250° C. 0.05/min | 59 | 33 | 35 | 28 | 44 | 54 | 61 | 37 |
| Spiral mold, 500° F., 1,000 p.s.i | 8.4 | 9.2 | 9.3 | 11.1 | 8.1 | 8.4 | 8.6 | 8.7 |
| Extrusion quality/temperature | (²) | (³) | (³) | (⁴) | (⁵) | | (⁵) | (⁶) |

¹ Capillary melt viscometer.  ² Fair-poor/600° F.  ³ Very good/600° F.  ⁴ Very good/575° F.  ⁵ Fair/575° F.  ⁶ Good/600° F.

We claim as our invention:

1. In the process for the preparation of a block copolymer having the general configuration

A—B—A wherein each A is a polyvinyl arene block having (a) an average molecular weight between 8,000 and about 35,000; and (b) between about 7.5 and 30 mol percent of the block have an average molecular weight between 3,000 and 12,000; and B is a conjugated diene block having an average molecular weight between about 40,000 and 150,000, the weight percentage of polyvinyl arene blocks in the total block copolymer being between about 15 and 40 percent, wherein a vinyl arene is polymerized in the presence of a secondary alkyl lithium catalyst to form lithium-terminated polymer blocks having (a) an average molecular weight between 8,000 and about 35,000; and (b) between about 7.5 and 30 mol percent of the blocks having an average molecular weight between 3,000 and 12,000; and a conjugated diene is block polymerized therewith to form an intermediate block copolymer A—½B—Li and this intermediate is coupled with a difunctional coupling agent whereby the

References Cited

UNITED STATES PATENTS 3,177,190  4/1965  Hsieh.
3,182,052  5/1965  Naylor _____ 260—894 XR
3,231,635  1/1966  Holden et al.
3,322,856  5/1967  Holden et al.

SAMUEL H. BLECH, Primary Examiner

J. C. BLEUTGE, Assistant Examiner

U.S. Cl. X.R.

260—879, 880, 23.7, 93.5